United States Patent [19]

Namiki et al.

[11] Patent Number: 5,198,669

[45] Date of Patent: Mar. 30, 1993

[54] DIGITAL X-RAY IMAGE PROCESSING APPARATUS

[75] Inventors: Fumihiro Namiki, Machida; Shiro Takeda, Sagamihara; Takaki Shimura, Machida; Isamu Yamada, Kawasaki, all of Japan

[73] Assignee: Fujitsu Limited, Kawasaki, Japan

[21] Appl. No.: 908,915

[22] Filed: Jul. 2, 1992

Related U.S. Application Data

[63] Continuation of Ser. No. 821,902, Jan. 15, 1992, abandoned, which is a continuation of Ser. No. 585,630, Sep. 20, 1990, abandoned.

[30] Foreign Application Priority Data

| Sep. 20, 1989 | [JP] | Japan | 1-243635 |
| Sep. 20, 1989 | [JP] | Japan | 1-243636 |
| Sep. 20, 1989 | [JP] | Japan | 1-243637 |
| Nov. 20, 1989 | [JP] | Japan | 1-299753 |

[51] Int. Cl.$^5$ .......................................... G01N 23/04
[52] U.S. Cl. .................................... 290/327.2; 382/42
[58] Field of Search ............... 250/327.2 C, 327.2 G, 250/484.1; 382/42, 52, 18

[56] References Cited

U.S. PATENT DOCUMENTS

| 3,859,527 | 1/1975 | Luckey | |
| 4,310,886 | 1/1982 | Kato et al. | 250/327.2 |
| 4,682,028 | 7/1987 | Tanaka et al. | 250/327.2 |
| 4,963,739 | 10/1990 | Hishinuma | 250/327.2 |

FOREIGN PATENT DOCUMENTS

0175285  3/1986  European Pat. Off. .

Primary Examiner—Constantine Hannaher
Assistant Examiner—Richard Hanig
Attorney, Agent, or Firm—Staas & Halsey

[57] ABSTRACT

A digital X-ray image processing apparatus for exposing an X-ray transmitted through an object onto a photostimulable phosphor plate, for scanning the photostimulable phosphor plate by using an excitation beam to obtain an X-ray image, and for reading the X-ray image. The digital X-ray image processing apparatus includes an image storage unit for storing the X-ray image used for an actual read when diagnosing the object and a histogram storage unit for storing a standard histogram of the X-ray image. The standard histogram is formed by an intensity and frequency of the X-ray. Also provided is a first monitor unit for displaying the standard histogram read out from the histogram storage unit and a read conditions determination unit for determining actual read conditions of the X-ray image based on a latitude of the intensity of the X-ray in the standard histogram.

5 Claims, 17 Drawing Sheets

DIGITAL X-RAY IMAGE PROCESSING APPARATUS

This application is a continuation of application Ser. No. 70/821,902, filed Jan. 15, 1992, now abandoned, which is a continuation of U.S. application Ser. No. 07/585,630, filed Sep. 20, 1990, also abandoned.

BACKGROUND OF THE INVENTION

1. Field of the Invention

The present invention relates to a radiograph read apparatus, more particularly, it relates to a digital X-ray image processing apparatus mainly used in the field of medical equipment.

2. Description of the Related Art

An X-ray apparatus is widely used in various fields, particularly in the medical field. Conventionally, as an X-ray apparatus having high sensitivity and high resolution, there is a digital X-ray image processing apparatus displaying an X-ray image on a cathode-ray tube (CRT) instead of a conventional radiograph.

The above conventional digital X-ray image processing apparatus (see, for example, U.S. Pat. No. 3,859,527) uses a photostimulable phosphor plate constituted by a sheet-like fluorescence medium which is able to accumulate a part of the X-ray energy. This fluorescence medium accumulating the X-ray energy is called an "accumulative fluorescence body". The accumulative fluorescence body can accumulate the X-ray energy for a relatively long time.

In general, the digital X-ray image can be obtained by the following steps. That is, when the X-ray is irradiated on to an object, for example, a human body, the X-ray transmitted through the object exposes the photostimulable phosphor plate. When the photostimulable phosphor plate is scanned by an excitation beam (for example, a laser beam), the energy accumulated on the fluorescence body is excited by the laser beam and a fluorescent light corresponding to the accumulated energy is emitted from the photostimulable phosphor plate.

The fluorescent light is collected by collection equipment, for example, bundled optical fibers, and converted to analog electrical signals by an optical-to-electrical converter. Further, the analog electrical signals are converted to digital signals to obtain a digital X-ray image on a monitor display apparatus.

In this case, to determine conditions in an actual reading of the X-ray image from the photostimulable phosphor plate, it is important to previously read an outline of the X-ray image (i.e., the state of the X-ray energy) accumulated on the fluorescence body prior to the actual read (below, "pre-scan").

The "actual read" means, in this case, that a doctor reads the X-ray image displayed on the monitor when diagnosing the object. For the photographic conditions during the actual read, it is necessary to determine a supply voltage for an X-ray tube, a multiplication rate of a photomultiplier, an amplification rate of the amplifier, and a distance between the X-ray tube and the object. In general, this photographic condition data is determined from pre-scan data.

There are some methods for pre-scanning in the conventional art.

In one method, prior to the actual read, the photostimulable phosphor plate is scanned by an excitation beam which is weaker than the excitation beam for the actual read. The quantity of the fluorescent light emitted by the weak excitation beam is measured by suitable measuring equipment so that it is possible to perform the pre-scan prior to the actual read.

In another method, when the X-ray is irradiated onto the photostimulable phosphor plate, a momentary fluorescent light is generated from the photostimulable phosphor plate. In this method, the momentary fluorescent light is measured by suitable measuring equipment so that it is possible to perform the pre-scan prior to the actual read. This method utilizes the characteristic that the intensity of the momentary fluorescent light is proportional to that of the fluorescent light in the actual read.

However, in these methods, much data which is not necessary for the diagnosis, such as a very strong X-ray intensity range and a very weak X-ray intensity range, are contained in the pre-scan data. That is, for example, in the diagnosis of the breast of a human body, although the intensity range of the X-rays for the diagnosis of the lungs is different from that of the X-rays for the diagnosis of ribs, various intensities of the X-rays are mixed in the pre-scan data.

SUMMARY OF THE INVENTION

The object of the present invention is to provide a digital X-ray image processing apparatus enabling determination of the optional intensity range of the X-ray in accordance with the object of the diagnosis to increase the precision of the diagnosis.

In accordance with the present invention, there is provided a digital X-ray image processing apparatus for exposing an X-ray transmitted through an object to a photostimulable phosphor plate, for scanning the photostimulable phosphor plate by means of an excitation beam to obtain an X-ray image, and for reading the X-ray image, the digital X-ray image processing apparatus including: an image storage unit for storing the X-ray image used for an actual read when diagnosing the object; a histogram storage unit for storing a standard histogram of the X-ray image, the standard histogram being constituted by an intensity of the X-ray and a frequency thereof; a first monitor unit for displaying the standard histogram read out from the histogram storage unit; and a read conditions determination unit for determining actual read conditions of the X-ray image based on a latitude of the intensity of the X-ray in the standard histogram.

In the preferred embodiment, a digital X-ray image processing apparatus further includes: a switching unit for switching between a pre-scan operation and the actual read operation; and a histogram calculation unit for calculating a pre-scan histogram based on pre-scan data obtained prior to the actual read in the pre-scan operation, and the pre-scan histogram being input to the first monitor means and used instead of the standard histogram.

In the preferred embodiment, a digital X-ray image processing apparatus further includes a second monitor unit for displaying the pre-scan histogram, and the actual read conditions being determined based on the latitude of the intensity of the X-ray in the pre-scan histogram.

In the preferred embodiment, a digital X-ray image processing apparatus further includes: a correlation analysis unit for receiving the pre-scan and standard histograms, and calculating a correlation value to move the standard histogram in the direction of the intensity of the X-ray so as to obtain a maximum correlation value between these histograms; and a histogram correlation unit for calculating a difference between the standard histogram and the pre-scan histogram, and correcting the latitude of the intensity of the X-ray used for the actual read.

In the preferred embodiment, a digital X-ray image processing apparatus, further includes: a gradation look up table for determining conditions of the gradation processing of the standard histogram in accordance with the diagnosis area of the object; and an emphasis coefficient unit for a spacial filter.

DESCRIPTION OF THE PREFERRED EMBODIMENTS

Figure 1:
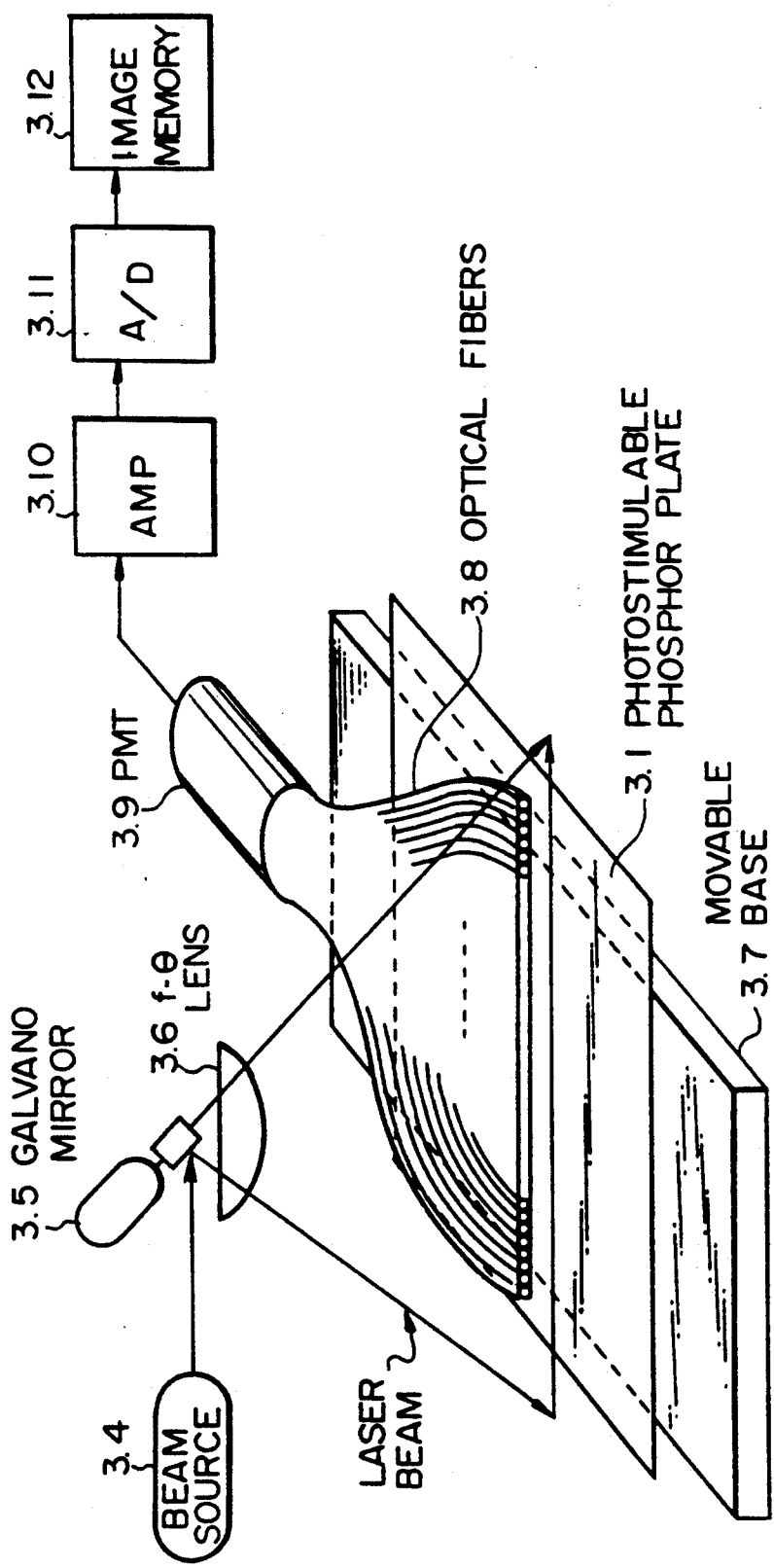
FIG. 1 is a basic structural view of a prior art digital X-ray image processing apparatus.

FIG. 1 is a basic structural view of a prior art digital X-ray image processing apparatus. In FIG. 1, reference number 3.1 denotes a photostimulable phosphor plate or mirror, 3.6 an f-$\theta$ lens, 3.7 a movable base, 3.8 bundled optical fibers, 3.9 a photomultiplier (PMT), 3.10 an amplifier (AMP), 3.11 an A/D converter (A/D), and 3.12 an image memory.

When the X-ray is irradiated on to the object 3.0 (see, FIG. 2), the X-ray transmitted through the object 3.0 exposes the photostimulable phosphor plate 3.1. When the photostimulable phosphor plate 3.1 is scanned by the excitation beam (for example, laser beam) emitted from the beam source 3.4 through the f-$\theta$ lens 3.6, the energy accumulated on the fluorescence body is excited by the laser beam and a fluorescent light corresponding to the accumulated energy is emitted from the photostimulable phosphor plate 3.1.

The movable base 3.7 is used for moving the photostimulable phosphor plate 3.1 to the sub-scanning direction. The fluorescent light is collected by collection equipment, for example, bundled optical fibers 3.8, and converted to the analog electrical signal by the photomultiplier 3.9. Further, the analog electrical signal is multiplied by the photomultiplier 3.9 and converted to digital signals by the A/D converter 3.11 to obtain the digital X-ray image on the CRT or the printer. The digital X-ray image is stored in the image memory 3.12.

Figure 2:
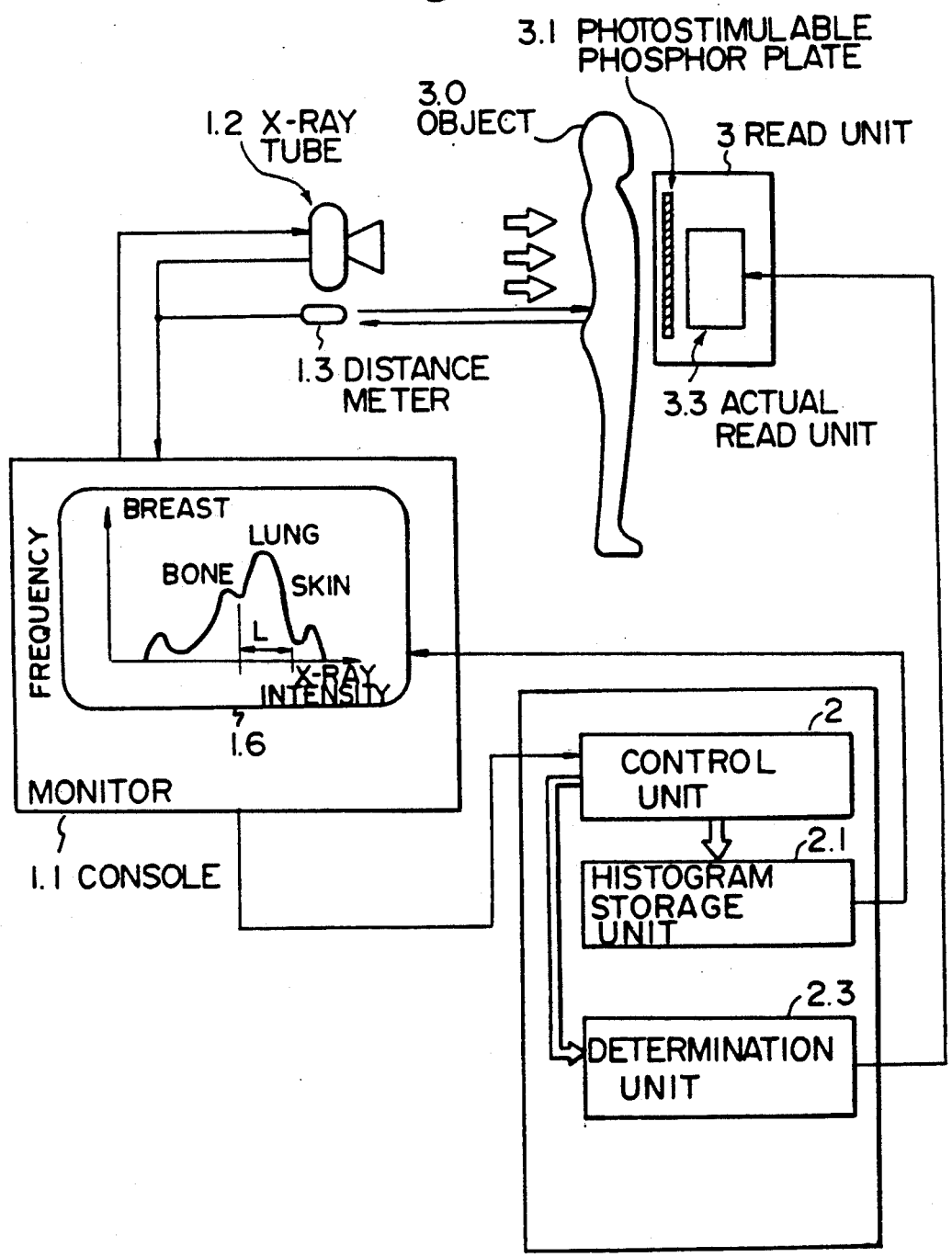
FIG. 2 is a schematic block diagram of a digital X-ray image processing apparatus according to a first embodiment of the present invention.

FIG. 2 is a schematic block diagram of a digital X-ray image processing apparatus according to a first embodiment of the present invention.

In FIG. 2, reference number 1.1 denotes a control console for controlling the supply voltage and current for an X-ray tube, and an irradiation time of the X-ray above data and a distance between the object and the X-ray tube are transmitted to a control unit 2. 1.2 denotes the X-ray tube, 1.3 denotes an ultrasonic distance meter, and 1.6 denotes a first monitor for displaying the histogram of the X-ray image.

Further, the control unit 2 receives various data output from the control console. 2.1 denotes a standard histogram storage unit for storing various standard histograms, and 2.3 denotes a determination unit for determining read conditions, for example, multiplication rate of the photomultiplier and amplification rate of the amplifier, at the actual read when diagnosing the object.

Still further, reference number 3 denotes a read unit, 3.0 denotes an object, 3.1 denotes a photostimulable phosphor plate, and 3.3 denotes an actual read unit.

The above various data are transmitted to the control unit 2 as the photographic conditions. Further, the distance data is also transmitted to control unit 2. The control unit 2 selects one of the standard histograms in accordance with the above photographic conditions. This selected standard histogram is displayed on the monitor 1.6. The standard histogram is made by estimating a histogram of the X-ray intensity accumulated on the photostimulable phosphor plate 3.1.

In this embodiment, the selected standard histogram indicating the relationship between the intensity of the X-ray (abscissa) and the frequency thereof (ordinate) is displayed on the first monitor 1.6 based on the above photographic conditions. A predetermined latitude of the X-ray intensity is selected on the abscissa of the histogram as the latitude at the actual read. As shown on the monitor 1.6, in the X-ray image of the breast, the frequency of the lungs portion is large, and that of the skin portion is small.

As shown in FIG. 2, the relationship between the X-ray intensity and the frequency thereof is different E among the bone (rib), the lungs, and the skin. Accordingly, when a doctor wishes to diagnose the lungs, the actual read is performed at the above latitude L of the X-ray intensity.

Figure 3:
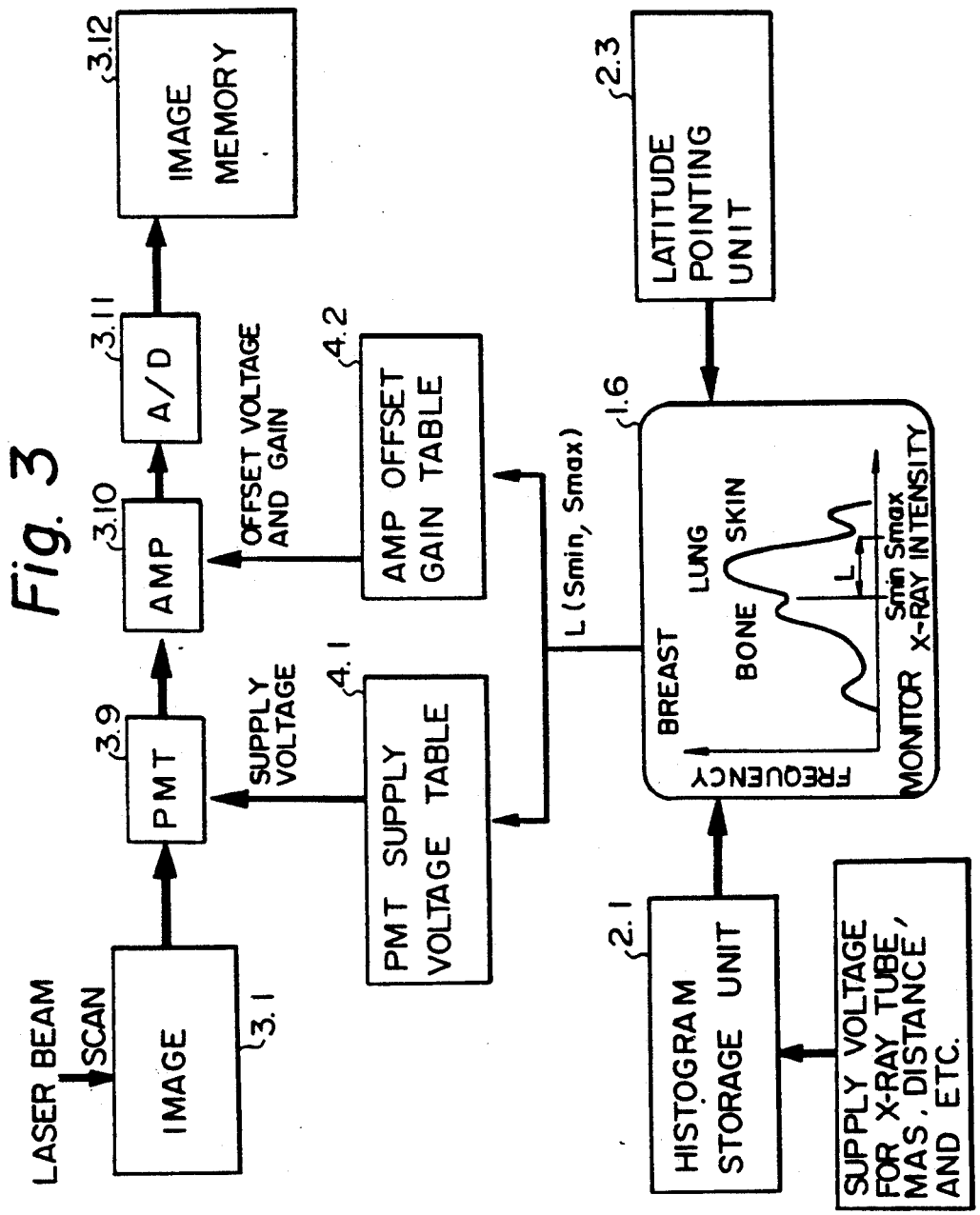
FIG. 3 is a detailed block diagram of the digital X-ray image processing apparatus shown in FIG. 2.

FIG. 3 is a detailed block diagram of the digital X-ray image processing apparatus shown in FIG. 2. In FIG. 3, reference number 4.1 denotes a PMT supply voltage table for storing conditions of the supply voltage in accordance with the predetermined latitude L, and 4.2 denotes an AMP offset gain table for storing the offset voltage and gain in accordance with the latitude L. 2.3 is a determination unit for determining the actual read conditions based on the latitude L to be pointed out by the doctor. In the monitor image 1.6, the latitude L is defined between the minimum intensity of the X-ray Smin and the maximum intensity of the X-ray Smax. The minimum intensity Smin and the maximum intensity Smax are input to the PMT supply voltage table 4.1 and the AMP offset gain table 4.2 to obtain optimal voltage and gain of the PMT and AMP.

Figure 4:
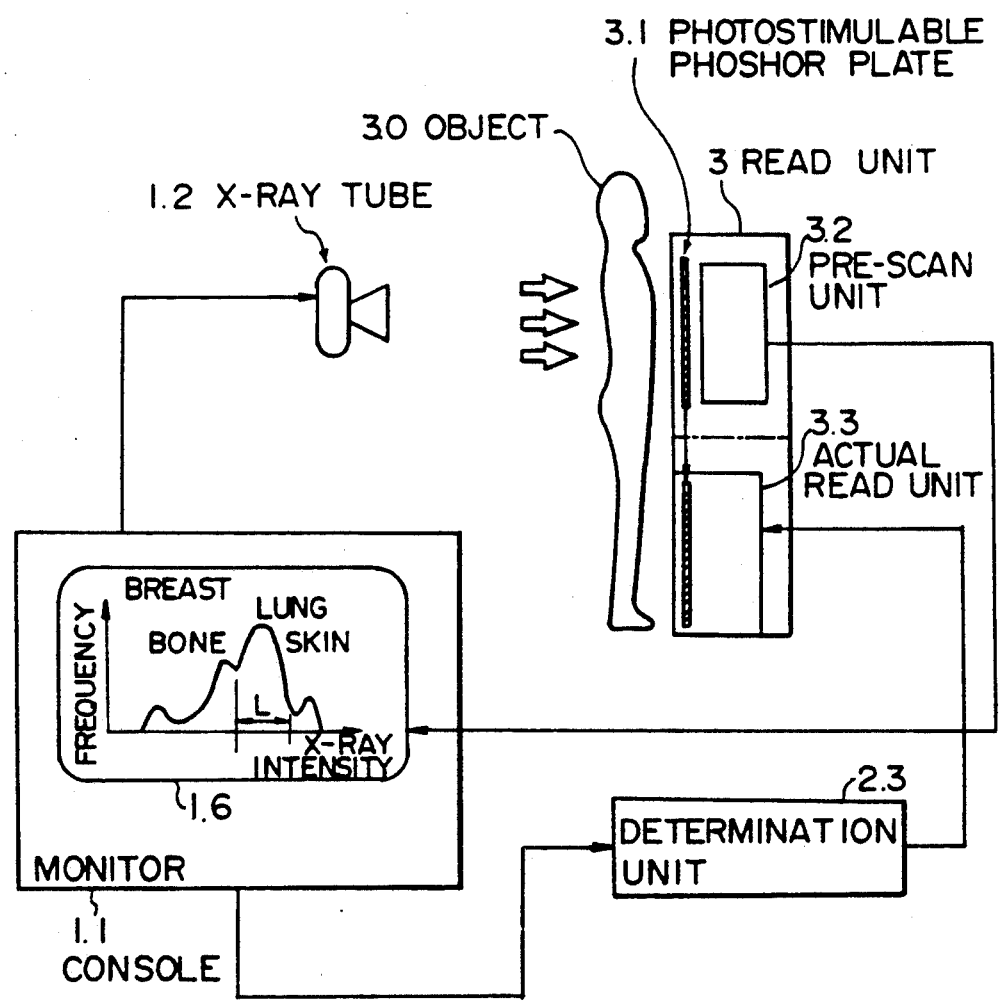
FIG. 4 is a schematic block diagram of a digital X-ray image processing apparatus according to a second embodiment of the present invention.

FIG. 4 is a schematic block diagram of a digital X-ray image processing apparatus according to a second embodiment of the present invention.

In FIG. 4, the same reference numbers as shown in FIG. 2 are attached to the same components. Reference number 3.2 denotes a pre-scan unit for obtaining a pre-scan histogram from the pre-scan data. In this embodiment, the pre-scan unit 3.2 is added to the read unit 3. The X-ray is irradiated on to the object 3.0 and the X-ray image is accumulated on the photostimulable phosphor plate 3.1. Accordingly, when the pre-scan data is obtained from the accumulated image as previously explained, the pre-scan histogram is calculated in the pre-scan unit 3.2. The pre-scan histogram is displayed on the monitor 1.6. The latitude L is determined on the pre-scan histogram. Further, based on the latitude L pointed out by the doctor, the photographic conditions are determined from the pre-scan histogram in the determination unit 2.3 as the actual read conditions.

Figure 5:
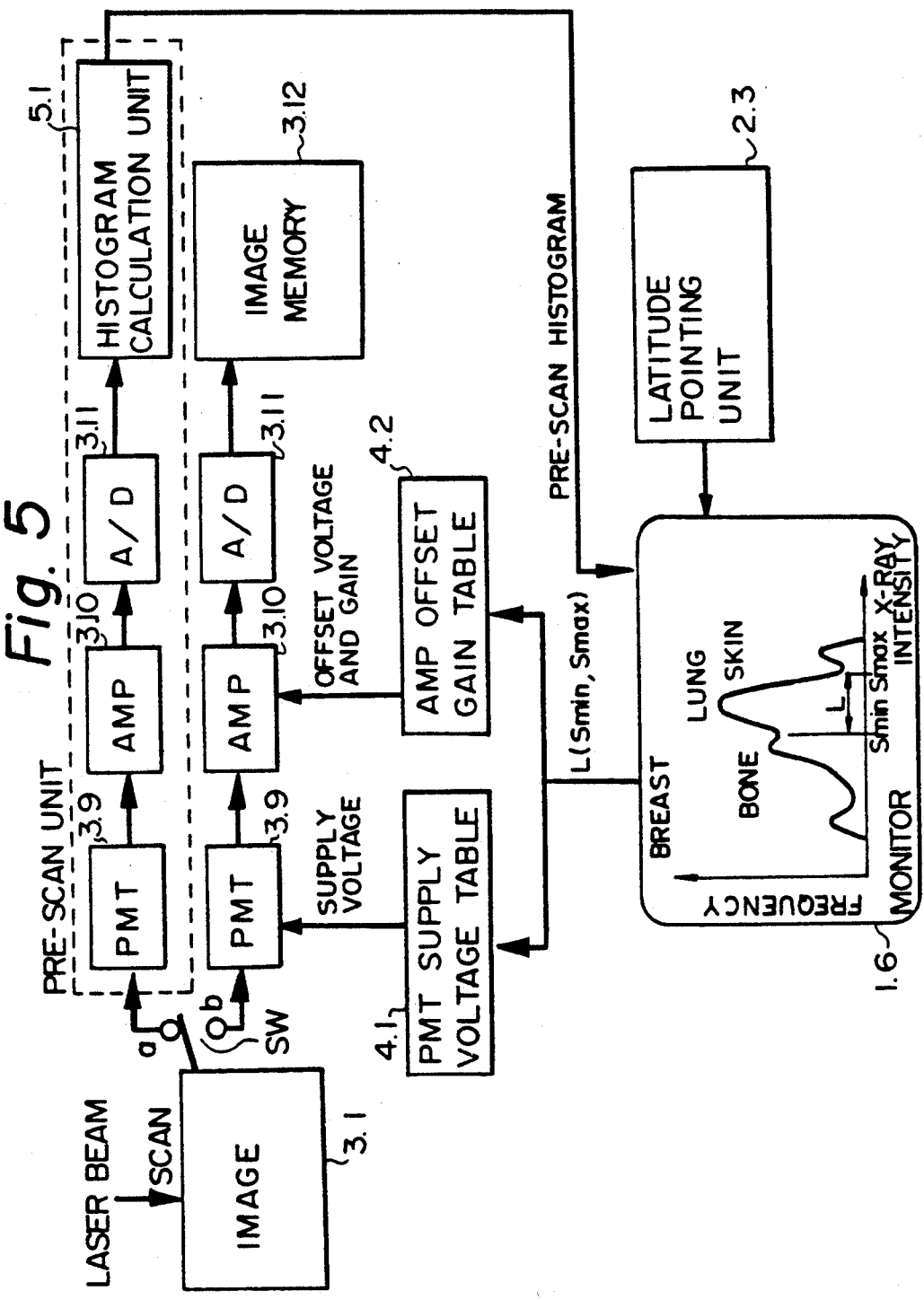
FIG. 5 is a detailed block diagram of the digital X-ray image processing apparatus shown in FIG. 4.

FIG. 5 is a detailed block diagram of the digital X-ray image processing apparatus shown in FIG. 4. In FIG. 5, reference number 5.1 denotes a pre-scan histogram calculation unit for obtaining the pre-scan histogram from the pre-scan data. The pre-scan histogram calculation unit 5.1 is included in the pre-scan unit 3.2 shown in FIG. 4.

Further, SW denotes a switching unit for switching between the pre-scan operation and the actual scan operation. In the position "a", the pre-scan histogram is obtained, and in the position "b", the actual read is performed. The pre-scan operation is performed before the actual read operation. The pre-scan histogram is displayed on the monitor 1.6.

Figure 6:
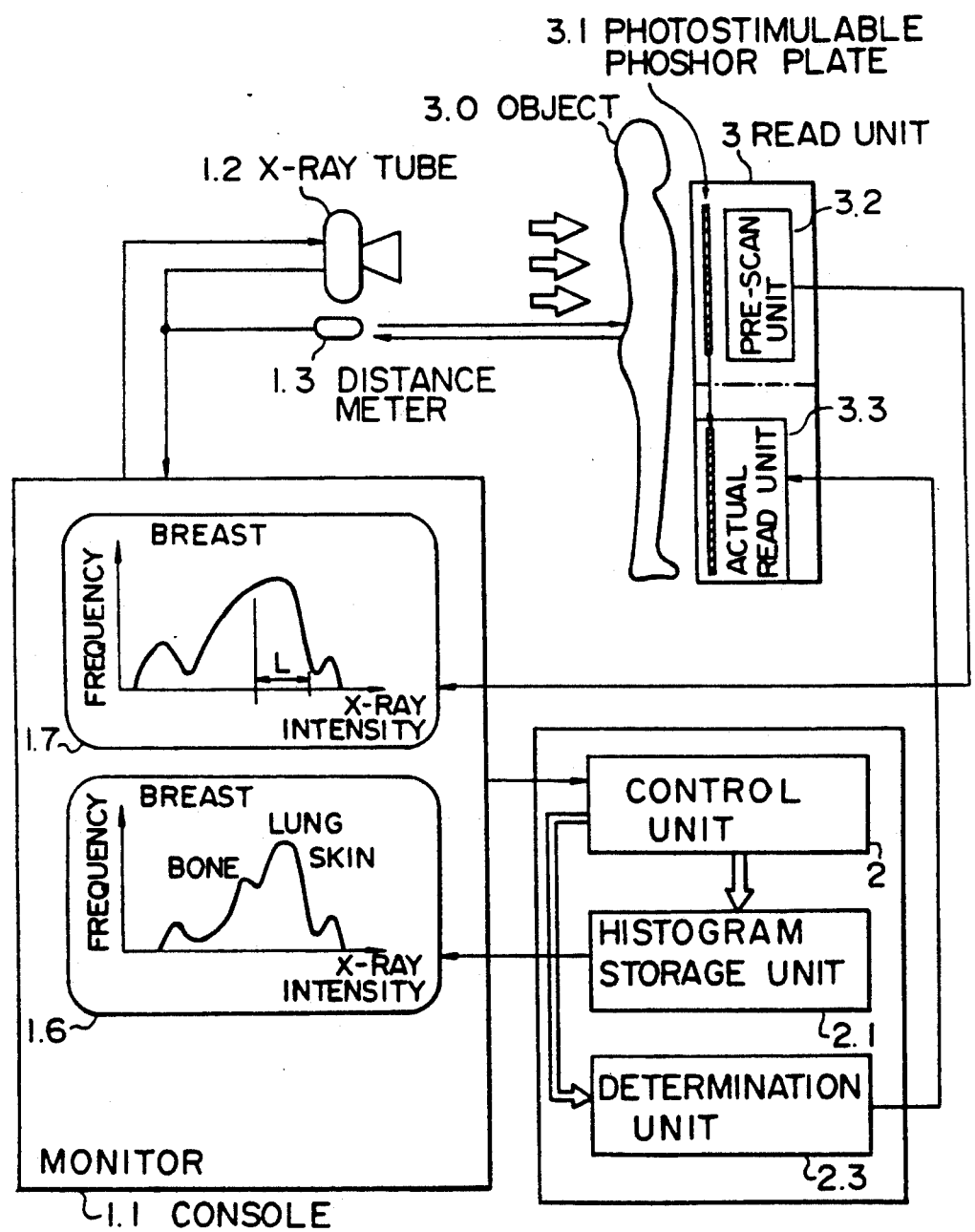
FIG. 6 is a schematic block diagram of a digital X-ray image processing apparatus according to a third embodiment of the present invention.

FIG. 6 is a schematic block diagram of a digital X-ray image processing apparatus according to a third embodiment of the present invention. Reference number 1.7 denotes a second monitor for displaying the pre-scan histogram transmitted from the pre-scan unit 3.2. In this embodiment, the first and the second monitors are provided on the control console 1.1. Accordingly, it is possible to simultaneously display the standard and the pre-scan histograms on the control console 1.1. Accordingly, the latitude L of the intensity of the X-ray in the pre-scan histogram can be easily defined with reference to the standard histogram. In this embodiment, if noise components are contained in the pre-scan histogram so that it is not possible to determine the latitude in the second monitor 1.7, it is possible to easily point out the latitude on the first monitor 1.6.

Figure 7:
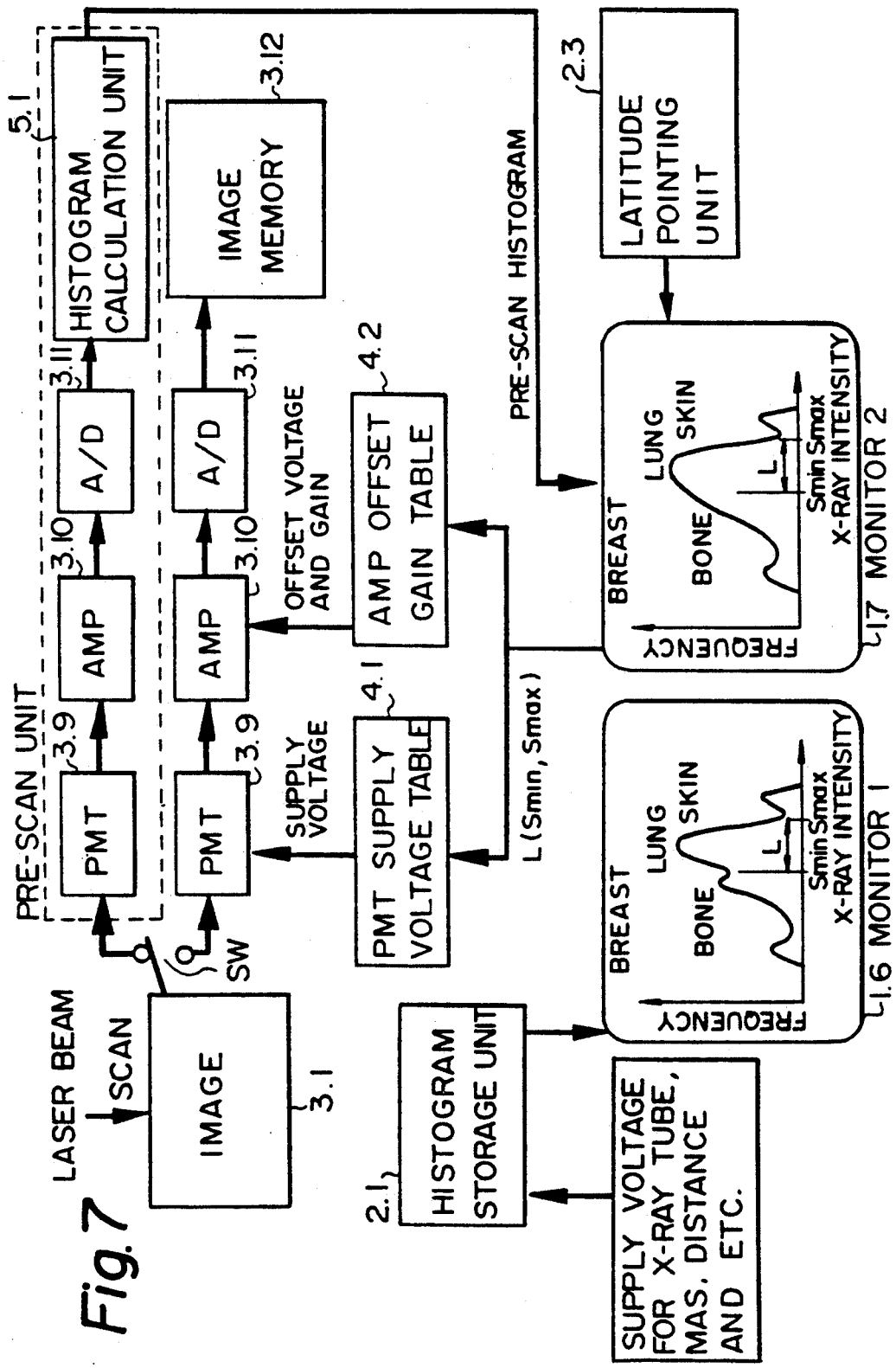
FIG. 7 is a detailed block diagram of the digital X-ray image processing apparatus shown in FIG. 6.

FIG. 7 is a detailed block diagram of the digital X-ray image processing apparatus shown in FIG. 6. The switching unit SW is switched to the pre-scan operation so that the pre-scan histogram of the histogram calculation unit 5.1 is output to the second monitor 1.7. The latitude L is pointed out on the pre-scan histogram in the second monitor 1.7.

Figure 8:
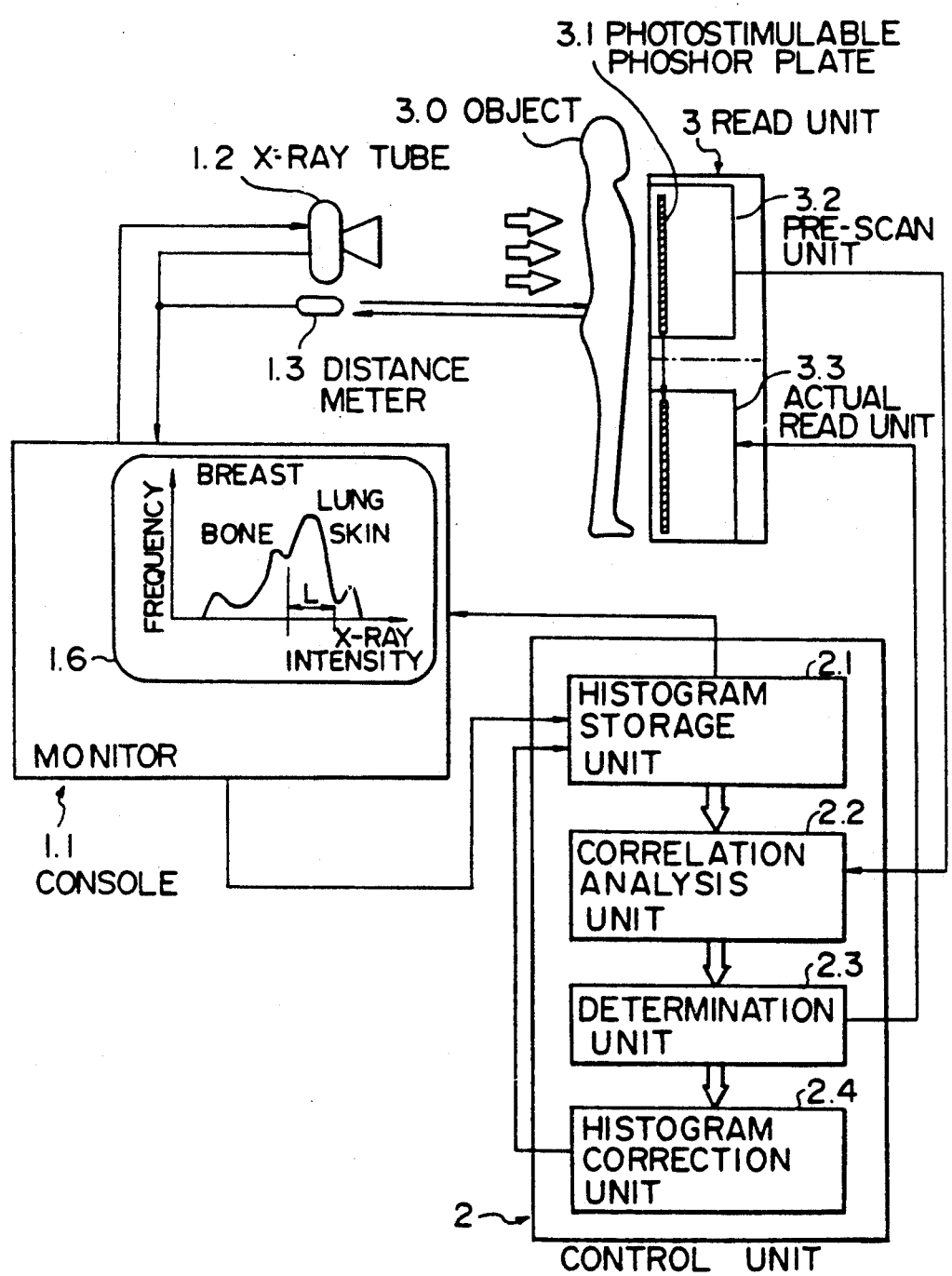
FIG. 8 is a schematic block diagram of a digital X-ray image processing apparatus according to a fourth embodiment of the present invention.

FIG. 8 is a schematic block diagram of a digital X-ray image processing apparatus according to a fourth embodiment of the present invention. In FIG. 8, reference number 2.2 denotes a correlation analysis unit, and 2.4 denotes a histogram correction unit. The correlation analysis unit 2.2 receives the pre-scan and standard histograms, and calculates the correlation value between the standard histogram and the pre-scan histogram to move the standard histogram in the direction of the intensity of the X-ray. Accordingly, it is possible to obtain a maximum correlation value between these histograms. The histogram correlation unit 2.4 calculates the difference between the standard histogram and the pre-scan histogram, and correct the latitude of the intensity of the X-ray used for the actual read.

Figure 9:
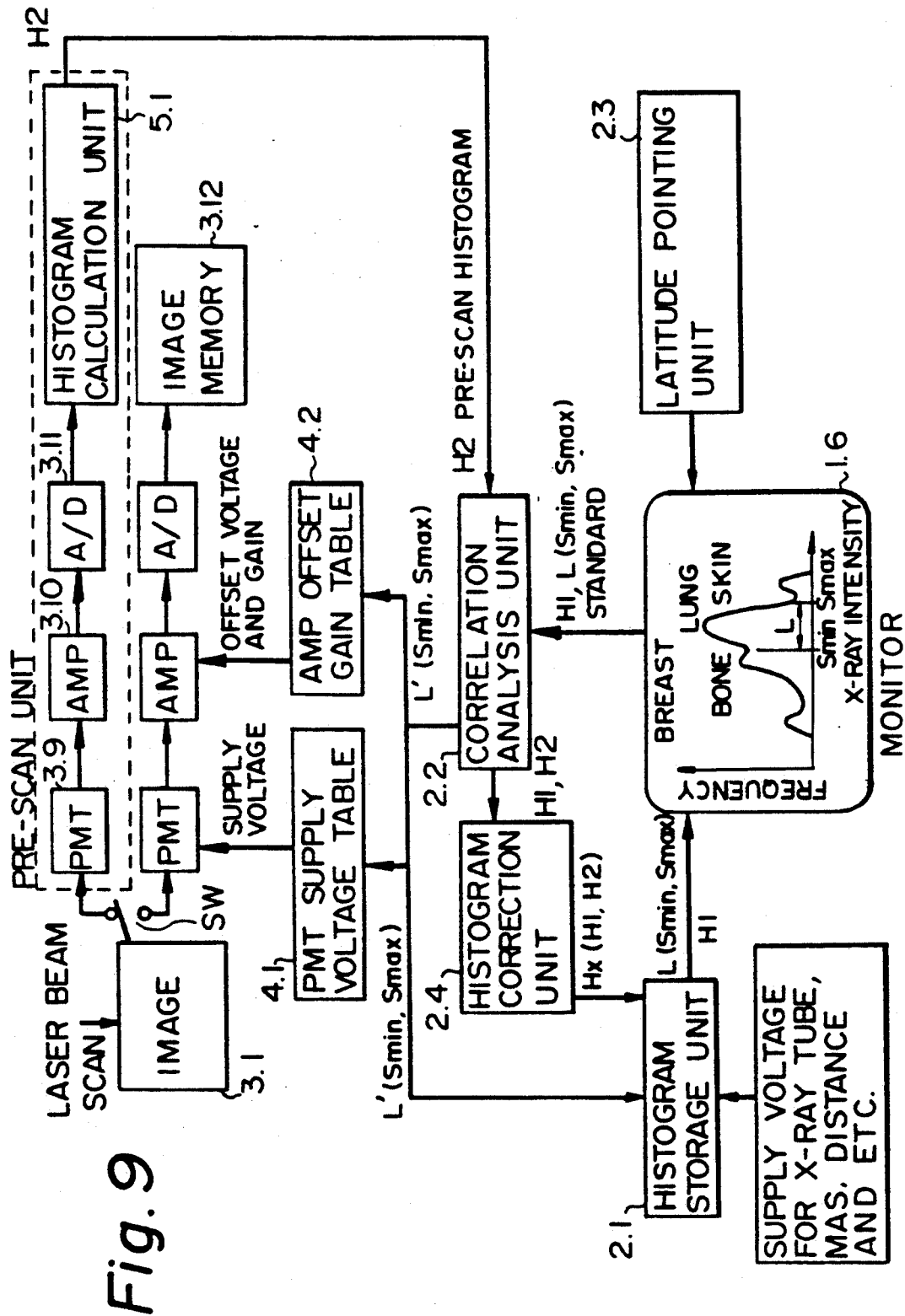
FIG. 9 is a detailed block diagram of the digital X-ray image processing apparatus shown in FIG. 8.

FIG. 9 is a detailed block diagram of the digital X-ray image processing apparatus shown in FIG. 8. The pre-scan histogram H2 is input to the correlation analysis unit 2. Further, the standard histogram H1 is also input to the correlation analysis unit 2.2. The correlation analysis unit 2.2 outputs a new latitude L' to determine the photographic conditions to the AMP offset table 4.2 and the PMT supply voltage table 4.1 after calculation of the maximum correlation. The correlation value obtained by the correlation analysis unit 2.2 is input to the histogram correction unit 2.4. The histogram Hx corrected by the histogram correction unit 24 is stored in the histogram storage unit 2.1. The standard histogram stored in the histogram storage unit 2.1 is displayed on the monitor 1.6. The operation of this embodiment is explained in detail below.

Figure 10:
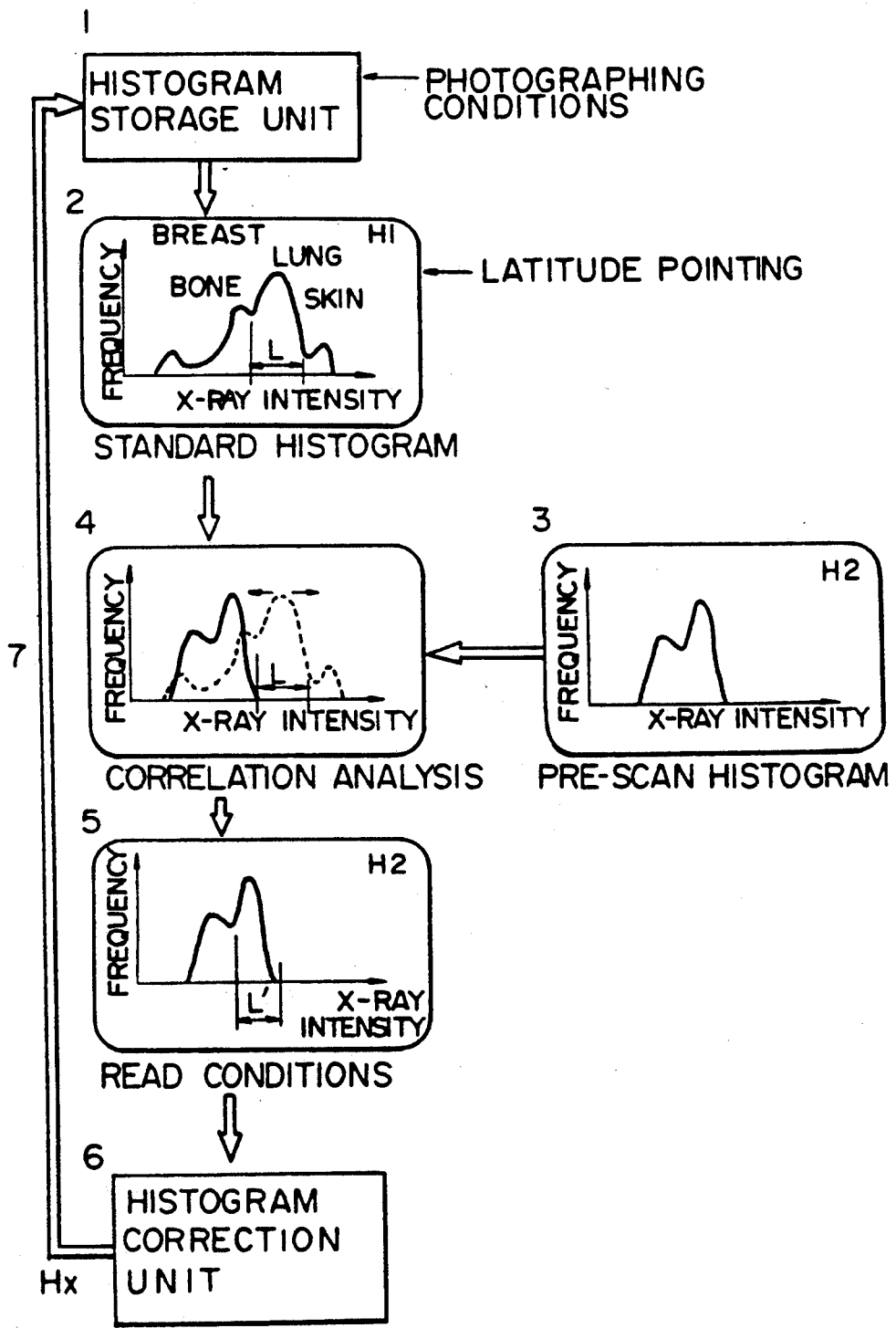
FIG. 10 is a view for explaining the process of the fourth embodiment shown in FIG. 9.

FIG. 10 is diagram for explaining the process of the fourth embodiment. First, the doctor inputs the photographic conditions, for example, the supply voltage, the object data, the purpose of the diagnosis, etc., from the control console 1.1.

In step 1, the histogram having the same photographic conditions as the above is selected from the contents of the standard histogram storage unit 2.1.

In step 2, the selected histogram is displayed on the monitor 1.6 as the standard histogram H1, and the latitude L is pointed out by the doctor.

In step 3, the pre-scan histogram H2 is calculated in the pre-scan histogram calculation unit 5.1, and input to the correlation analysis unit 4.2.

In step 4, the correlation value between the standard histogram H1 and the pre-scan histogram H2 is calculated in the correlation analysis unit 2.2. As shown by arrows, the standard histogram H1 is moved in the direction of the intensity of the X-ray so as to obtain the maximum correlation value.

In step 5, after calculation of the correlation, a new standard latitude L' is determined and displayed on the monitor. This new latitude L' is used for determining the actual read conditions when diagnosing the object.

In step 6, the difference between the standard histogram H1 and the pre-scan histogram H2 is calculated and the configuration of the standard histogram is corrected by the histogram correction unit 2.4.

In step 7, the histogram Hx corrected by the correction unit 2.4 is stored in the standard histogram storage unit 2.1 as the standard histogram.

Figure 11:
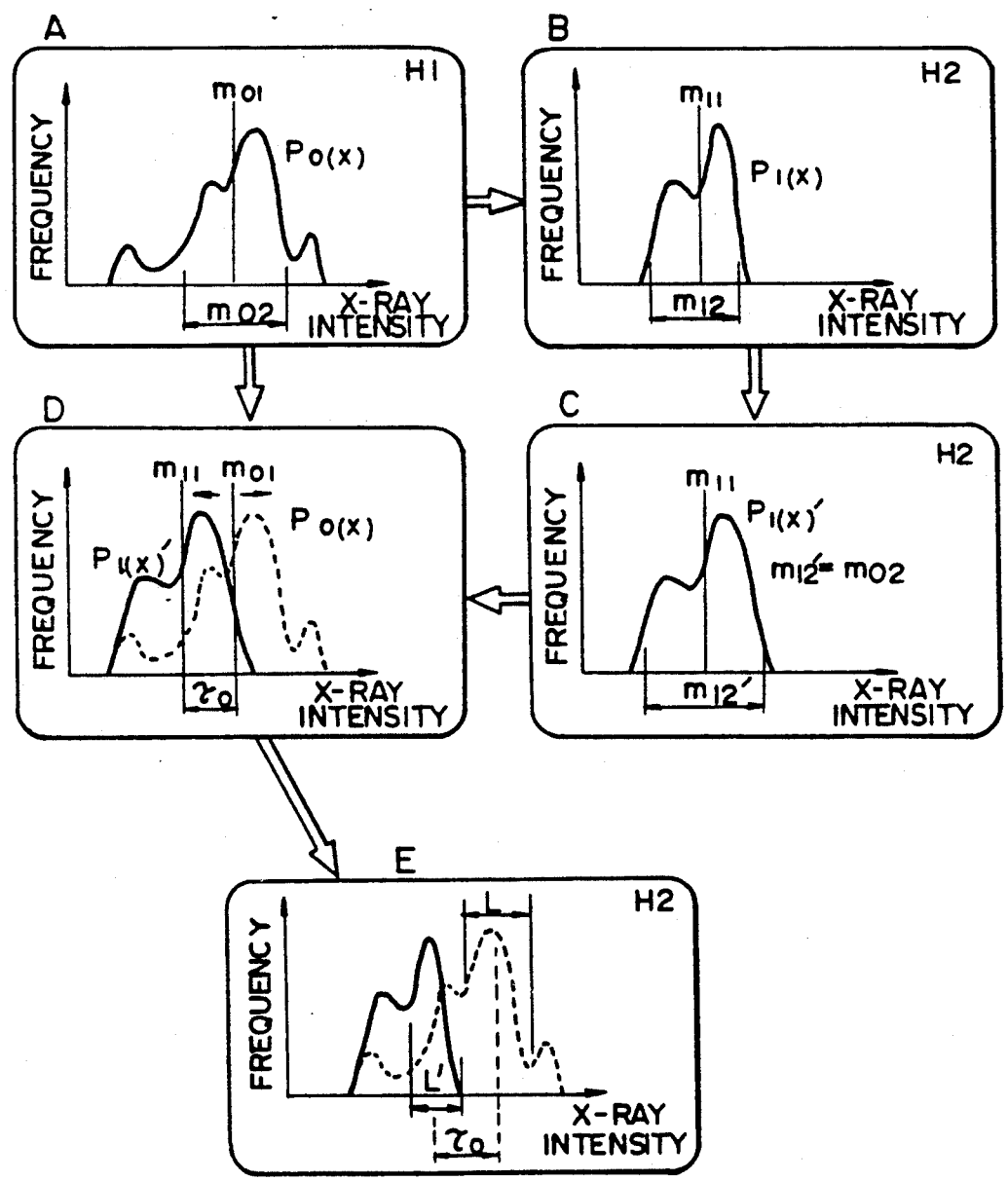
FIG. 11 is a view for explaining the maximum correlation value calculated in the correlation analysis unit shown in FIG. 9.

FIG. 11 is a view for explaining the maximum correlation value calculated in the correlation analysis unit 2.2 in the fourth embodiment. In FIG. 11, $P_{0(x)}$ denotes a probability density function of the standard histogram H1, and $P_{1(x)}$ denotes the probability density function of the pre-scan histogram H2. Further, $m_{01}$ and $m_{11}$ denote a first moment, and $m_{02}$ and $m_{12}$ denote a second moment. The subscript "0" denotes the standard histogram and the subscript "1" denotes the pre-scan histogram. In this case, the "first moment" denotes the center position of the histogram and the "second moment" denotes the latitude.

In FIG. 11, the monitor image A shows the probability density function of the standard histogram H1, and the monitor image B shows the probability density function of the standard histogram H2. As shown in images B and C, the width of the histogram H2 is broadened in accordance with the ratio of the second moment $m_{12}/m_{02}$.

The maximum correlation value $\tau_0$ is defined by the following formula.

$$\tau_0 = \int_{-\infty}^{\infty} \{P_0(x + \tau) \cdot P_1(x)\}dx \quad (1)$$

Accordingly, as shown in image D, the maximum correlation value $\tau_0$ is defined by the difference between the first moments $(m_{01} - m_{11})$ As shown in Fig. E, the latitude L is corrected in accordance with the maximum correlation value $\tau_0$ so that a new latitude L' is pointed out on the histogram H2. That is, the center of the latitude L is shifted by the maximum correlation value $\tau_0$. The shifted new center is defined as the center of the latitude L'. The latitude L' is defined by the following formula, $$L' = (m_{12}/m_{02}) \times L \quad (2)$$

Figure 12:
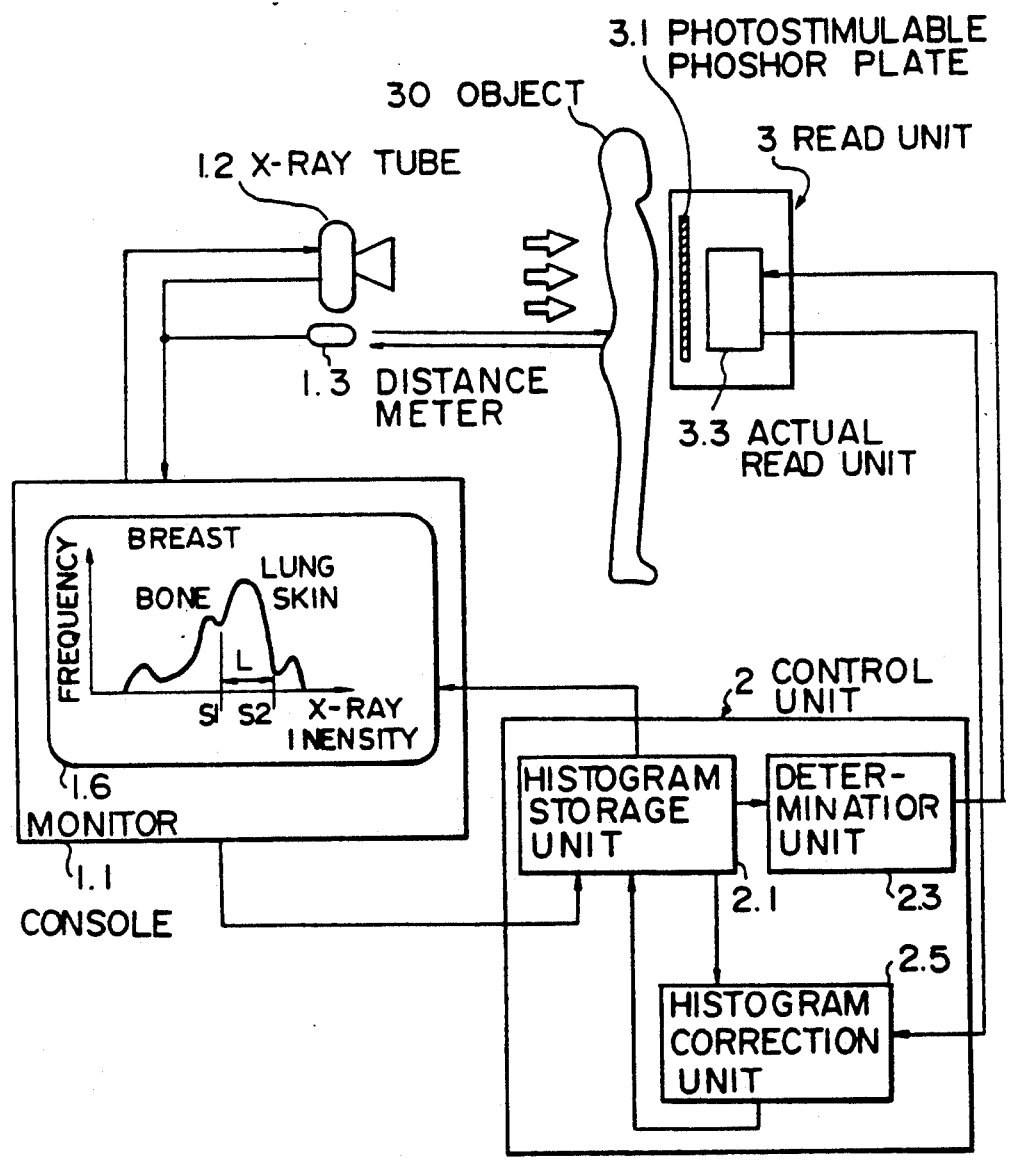
FIG. 12 is a schematic block diagram of a digital X-ray image processing apparatus according to a fifth embodiment of the present invention.

FIG. 12 is a schematic block diagram of a digital X-ray image processing apparatus according to a fifth embodiment of the present invention. In this embodiment, the second histogram correction unit 2.5 is used for correcting the standard histogram stored in the histogram storage unit 2.1 based on the actual read histogram. The corrected standard histogram is again stored in the histogram storage unit 2.1. In this case, the actual read is performed for the latitude L on the first standard histogram under the predetermined read conditions, then, the standard histogram is corrected based on the actual read histogram so as to comply with the desired latitude to be diagnosed.

Figure 13:
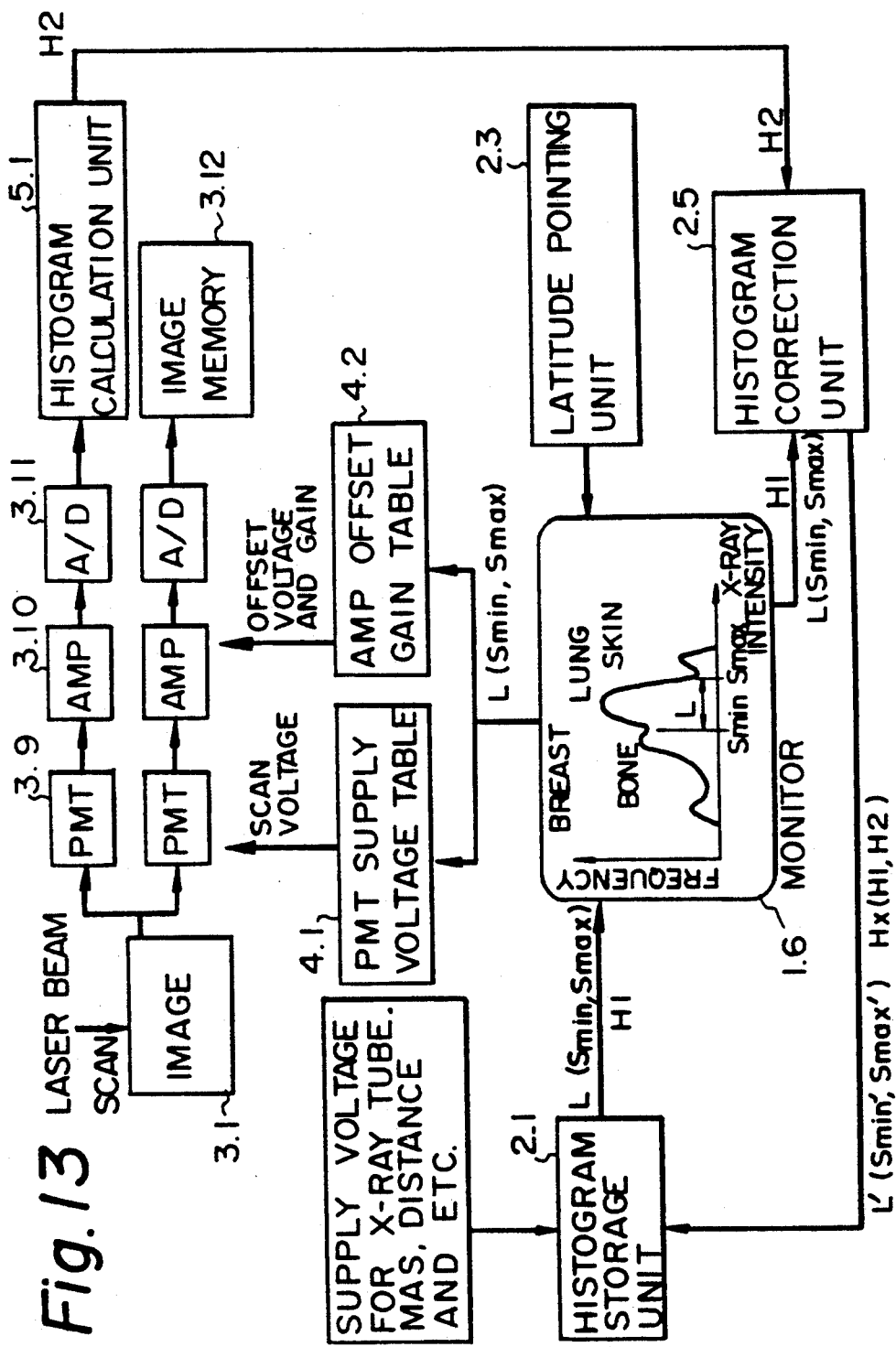
FIG. 13 is a detailed block diagram of the digital X-ray image processing apparatus shown in FIG. 12.

FIG. 13 is a detailed block diagram of the digital X-ray image processing apparatus shown in FIG. 12. The histogram H2 calculated by the histogram calculation unit 5.1 is output to the histogram correction unit 2.5. Further, the standard histogram H1 and the latitude L are input to the histogram correction unit 2.5. The corrected histogram Hx (new standard histogram) and new latitude L' from the histogram correction unit 2.5 are stored in the histogram storage unit 2.1. The operation of the fifth embodiment is explained in detail below.

Figure 14:
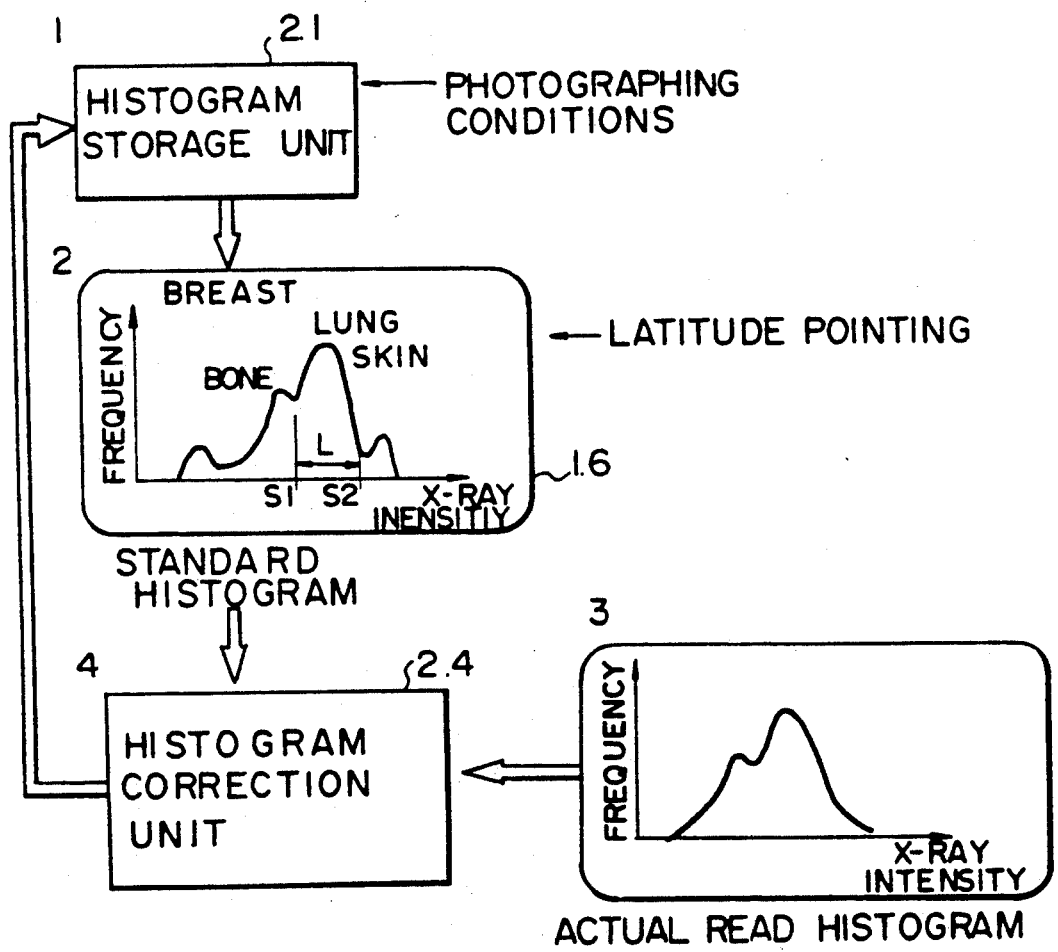
FIG. 14 is a view for explaining the process of the fifth embodiment shown in FIG. 12.

FIG. 14 is a diagram for explaining the process of the fifth embodiment. First, the doctor inputs the photographic conditions, for example, the object data, the purpose of the diagnosis, etc., from the control console 1.1.

In step 1, the histogram having the same photographic conditions as the above is selected from the contents of the standard histogram storage unit 2.1 instead of the standard histogram H1.

In step 2, the selected histogram is displayed on the monitor 1.6 as the standard histogram H1. Further, the latitude L is pointed out by the doctor. The latitude L is pointed out in the range between the minimum intensity Smin and the maximum intensity Smax.

In step 3, the actual read histogram is obtained by another means for the actual read, and this actual read histogram is output to the histogram correction unit 2.5 to correct the standard histogram previously stored.

In step 4, the corrected actual read histogram is stored in the histogram storage unit 2.1 instead of the standard histogram.

Figure 15:
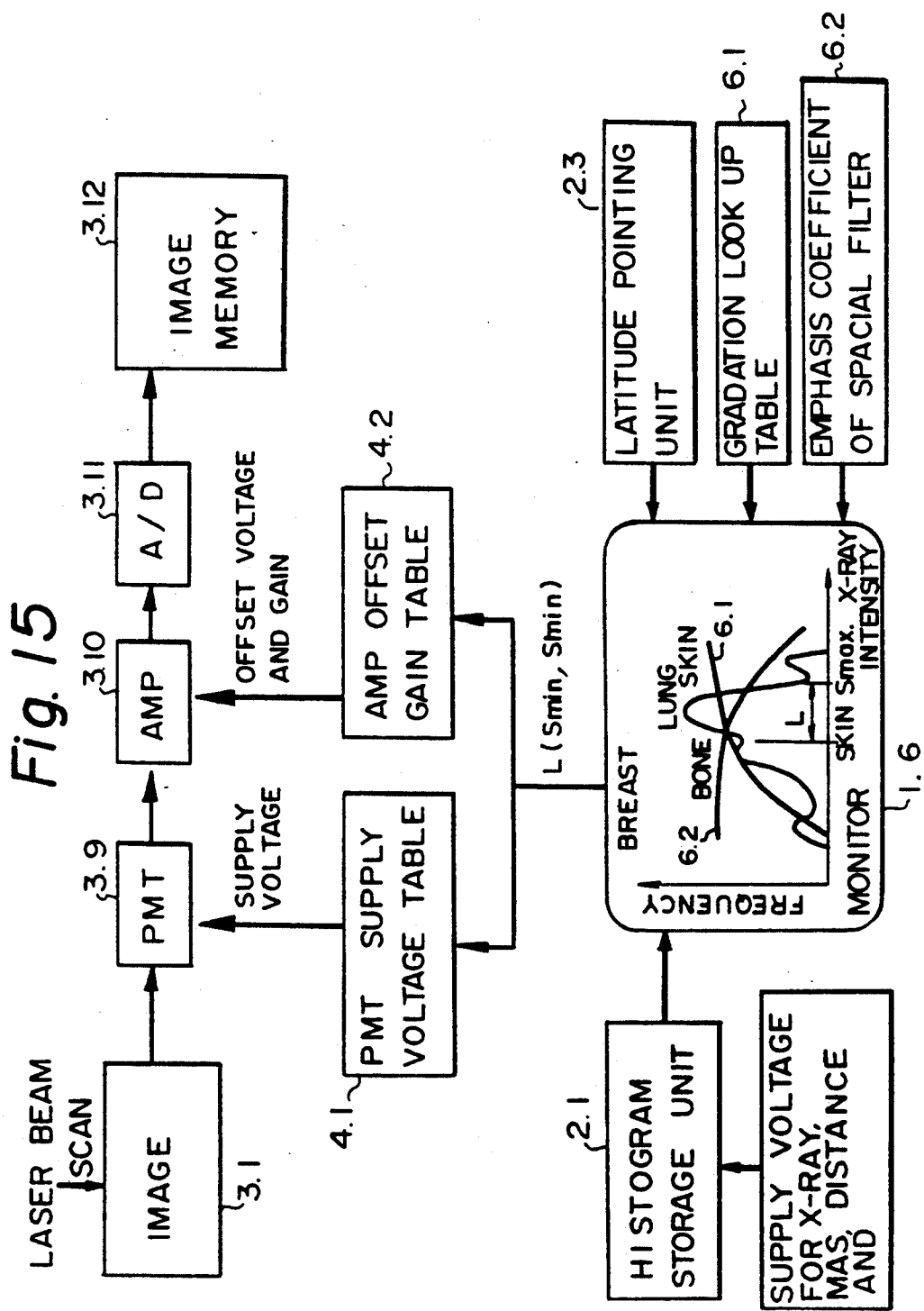
FIG. 15 is a detailed block diagram of the digital X-ray image processing apparatus according to a sixth embodiment of the present invention.

FIG. 15 is a detailed block diagram of the digital X-ray image processing apparatus according to a sixth embodiment of the present invention. In FIG. 15, reference number 6.1 denotes a gradation look-up table, and 6.2 denotes an emphasis coefficient means of a spacial filter for spacial frequency. The data of the gradation look up table 6.1 is input to the monitor 1.6. Further, the emphasis coefficient of the spacial frequency is also input to the monitor 1.6. In the monitor 1.6, the curve 6.1 denotes a gradation processing curve, and the curve 6.2 denotes an emphasis coefficient curve. The gradation and the emphasis coefficient are explained in detail below. In this embodiment, the gradation curve and the emphasis coefficient curve are displayed on the same histogram. In this case, the histogram pattern is not revised under the above curves, and the conditions of the image processing is revised based on the above curves.

Figure 16:
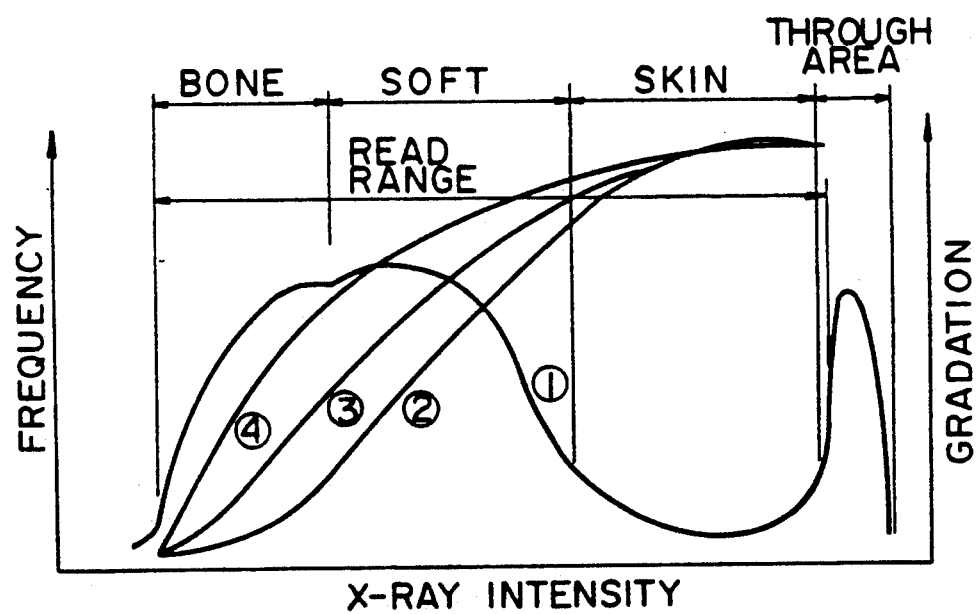
FIG. 16 is a view for explaining conditions of the gradation processing.

FIG. 16 is a graph for explaining the conditions of the gradation processing. In FIG. 16, the abscissa denotes the intensity of the X-ray. The left side of the ordinate denotes the frequency, and the right side of the ordinate denotes the gradation rate.

In this embodiment, the curves each indicating the conditions of the gradation processing are displayed on the monitor with the standard histogram.

Reference number 1 is a curve indicating the standard histogram. Reference number 2 is a curve indicating the conditions of the gradation processing when the doctor wishes to diagnose the soft portion of the object. Further, reference number 3 is a curve indicating the conditions of the gradation processing when the doctor wish to diagnose the whole object, i.e., the bone portion, the soft portion and the skin portion. Reference number 4 is a curve indicating the conditions of the gradation processing when the doctor wishes to diagnose the bone portion. However the standard histogram 1 is not revised in accordance with the gradation processing operation and the conditions of the image processing are changed in accordance with the gradation curve.

Figure 17:
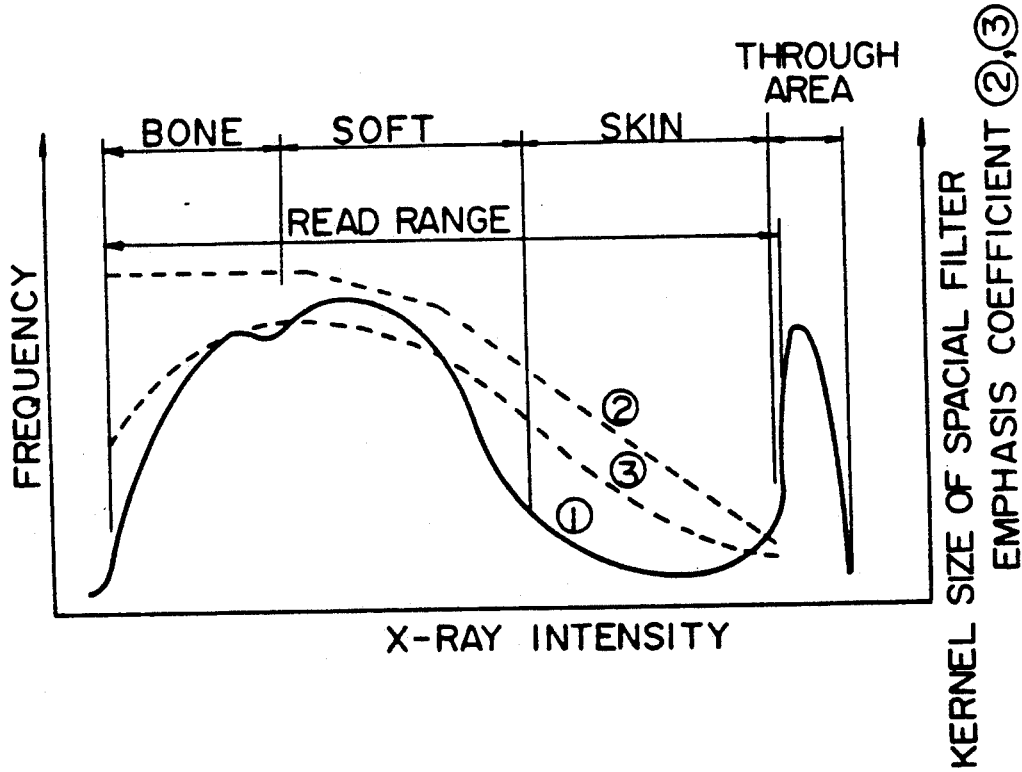
FIG. 17 is a view for explaining an emphasis coefficient shown in FIG. 15.

FIG. 17 is a graph for explaining the emphasis coefficient of the spacial frequency. In FIG. 17, the abscissa denotes the intensity of the X-ray. The left side of the ordinate denotes the frequency, and the right side of the ordinate denotes the emphasis coefficient of the kernel size of the spacial filter.

In this embodiment, the curves 1 to 3 are displayed on the monitor with the standard histogram. Reference number 1 is the curve indicating the standard histogram, and reference numbers 2 and 3 are the curve indicating the emphasis coefficient. However, the standard histogram is not revised in accordance with the spacial frequency and the emphasis coefficient of the kernel size of the spacial filter.

We claim:

1. A digital X-ray image processing apparatus for exposing an X-ray transmitted through an object on to a photostimulable phosphor plate, for scanning the photostimulable phosphor plate by means of an excitation beam to obtain an X-ray image, and for reading the X-ray image, the digital X-ray image processing apparatus comprising:

image storing means for storing the X-ray image used for an actual read when diagnosing the object;

histogram storage means for storing a standard histogram of the X-ray image, a standard histogram being formed by data of the photographic conditions from the X-ray including voltage, current, exposure time and distance of an X-ray tube, conditions of the photographic member including bone, skin, lungs and breasts, and conditions of the object to be X-rayed including thinness or thickness of the object;

first monitor mans for displaying the standard histogram read out from said histogram storage means; and read conditions determination means for determining actual read conditions of the X-ray image based on a latitude of the intensity of the X-ray in the standard histogram stored in said histogram storage means, without a pre-scanning operation.

2. A digital X-ray image processing apparatus as claimed in claim 1, further comprising:

gradation look up table means for determining conditions of the gradation processing of the standard histogram in accordance with the diagnosis area of the object; and emphasis coefficient means for spacial filtering, the gradation curve from said gradation look-up tables means, an emphasis coefficient from said emphasis coefficient means, and the standard histogram being simultaneously displayed at said monitor means.

3. A digital X-ray image processing apparatus as claimed in claim 1, further comprising:

a second histogram correction unit, operatively connected to said histogram storage means, for correcting the standard histogram stored in said histogram storage means based on the actual read histogram, and the corrected standard histogram being stored again in said histogram storage means.

4. A digital X-ray image process apparatus as claimed in claim 1, further comprising second monitor means for displaying the pre-scan histogram, and the actual read conditions being determined based on the latitude of the intensity of the X-ray in the pre-scan histogram.

5. A digital X-ray image processing apparatus for exposing an X-ray transmitted through an object onto a photostimulable phosphor plate, for scanning the photostimulable phosphor plate by means of an excitation beam to obtain an X-ray image, and for reading the X-ray image, the digital X-ray image processing apparatus comprising;

image storing means for storing the X-ray image used for an actual read when diagnosing the object;

histogram storage means for storing a standard histogram of the X-ray image, a standard histogram being formed by data of the photographic conditions from the X-ray including voltage, current, exposure time and distance of an X-ray tube, conditions of the photographic member including bond, skin, lungs and breasts, and conditions of the object to be X-rayed including the thinness or thickness of the object;

first monitor means for displaying the standard histogram read out from said histogram storage means;

read conditions determination means for determining actual read conditions of the X-ray image based on a latitude of the intensity of the X-ray in the standard histogram stored in said histogram storage means, without a pre-scanning operation;

switching means for switching between a pre-scan operation and the actual read operation;

a histogram calculation unit, operatively connected to said switching means, for calculating a pre-scan histogram based on a pre-scan data obtained prior to the actual read in the pre-scan operation, the pre-scan histogram being input to said first monitor means and used instead of the standard histogram;

a correlation analysis unit, operatively connected to said histogram storage means and said histogram calculation unit, for receiving the pre-scan and standard histograms, and calculating a correlation value to move the standard histogram in the direction of the intensity of the X-ray to obtain a maximum correlation value between the histograms; and a histogram correction unit, operatively connected to said correlation analysis unit, for calculating a difference between the standard histogram and the pre-scan histogram, and correcting the latitude of the intensity of the X-ray used for the actual read operation.

* * * * *

UNITED STATES PATENT AND TRADEMARK OFFICE
CERTIFICATE OF CORRECTION

PATENT NO. : 5,198,669

DATED : MARCH 30, 1993

INVENTOR(S) : FUMIHIRO NAMIKI ET AL.

It is certified that error appears in the above-indentified patent and that said Letters Patent is hereby corrected as shown below:

Col. 1, line 6, "70/821,902," should be --07/821,902,--.

Col. 3, line 63, "mirror," should be --sheet, 3.4. an excitation beam source, 3.5 a galvanometer mirror,--.

Col. 4, line 60, "E" should be deleted.

Col. 9, line 34, "tables" should be --table--;
line 48, "process" should be --processing--.

Col. 10, line 17, "bond," should be --bone,--.

Signed and Sealed this

Twelfth Day of April, 1994

Attest:

BRUCE LEHMAN

*Commissioner of Patents and Trademarks*

*Attesting Officer*